United States Patent [19]

Troxell, Jr.

[11] Patent Number: 4,761,023

[45] Date of Patent: Aug. 2, 1988

[54] TELESCOPING JOINT

[75] Inventor: John N. Troxell, Jr., Houston, Tex.

[73] Assignee: Cameron Iron Works, Inc., Houston, Tex.

[21] Appl. No.: 945,885

[22] Filed: Dec. 24, 1986

[51] Int. Cl.$^4$ ............................................. F16L 35/00
[52] U.S. Cl. ........................................ 285/18; 285/31; 285/93; 285/96; 285/101; 285/111
[58] Field of Search ...................... 285/18, 31, 96, 101, 285/93, 111

[56] References Cited

U.S. PATENT DOCUMENTS

| | | | |
|---|---|---|---|
| 3,071,188 | 1/1963 | Raulins | 285/18 X |
| 3,097,866 | 7/1963 | Iversen | 285/18 |
| 3,874,706 | 4/1975 | Arnold | 285/96 X |
| 4,078,832 | 3/1978 | Wittman | 285/18 |
| 4,109,945 | 8/1978 | Manchester et al. | 285/323 |
| 4,131,287 | 12/1978 | Gunderson et al. | 277/191 |
| 4,178,020 | 12/1979 | Dopyera | 285/96 X |
| 4,200,312 | 4/1980 | Watkins | 285/96 X |
| 4,371,198 | 2/1983 | Martin | 285/165 |
| 4,569,540 | 2/1986 | Beson | 285/93 |

Primary Examiner—Thomas F. Callaghan
Attorney, Agent, or Firm—Vinson & Elkins

[57] ABSTRACT

An improved telescoping joint suitable for use in repair of subsea pipelines including an inner tubular member, an outer tubular member for receiving the inner tubular member therein with an annulus between the members with seals establishing effective piston areas for extending the joint by causing relative extending movement between the members and relative retracting movement between the members, a pressure responsive locking piston for camming gripping elements into tight locking engagement between the members, and a pressure responsive piston and seal for providing a metal-to-metal seal between the members upstream of the extending piston area, the retracting piston area and the lock. Additionally a testing port is provide to establish the fluid tightness of the seal in the subsea location prior to the installation of the joint into the pipeline as a replacement for a damages section which has been removed. Both the lock and seal are releasable by reversing the application of fluid pressure to their pistons or piston areas.

11 Claims, 4 Drawing Sheets

TELESCOPING JOINT

BACKGROUND

Telescoping joints for pipelines have long been known since it is important in the repair of pipelines, particularly subsea pipelines, that the damaged section be removed and that a piece of the correct length be inserted in place of the removed section. In subsea locations, the repair of pipelines is done by divers or remotely operated vehicles. The repair of subsea pipelines generally requires that the operation of the replacement section include a telescoping joint and that it be easy and simple to operate so that divers or remotely operated vehicles may perform such repairs with a maximum of efficiency.

U.S. Pat. No. 4,371,198 discloses a telescoping joint with metal bellows for sealing and locking the joint. The metal bellows is positioned in an annular space between the outer members interior surface and the inner members exterior surface. Actuation is pressure responsive, which moves annular pistons into compressive engagement with the bellows causing the bellows to move radially outward and inward into sealing engagement with the above mentioned surfaces.

U.S. Pat. No. 4,109,945 discloses another telescoping joint with separate sealing and gripping means. The sealing sleeve is moved by flange bolts to set the annular seal and the gripping sleeve is also similarly moved to set the gripping slips.

U.S. Pat. No. 4,131,287 discloses an annular seal for use in an oil and gas well. This seal involves a central metal seal member having inner and outer lips facing in both directions and wedge members positioned between the lips to force them into tight sealing engagement with the inner and outer walls. Each of the legs has a tapered shoulder which is adapted to engage with a mating taper on its wedge. The engagement of these tapers causes the lips to be urged away from the wall against which each lip is in sealing engagement on retraction of the wedge and thus assists in the unsetting of the seal assembly.

A recently filed U.S. patent application, Ser. No. 06/761,692, filed Aug. 2, 1985, now U.S. Pat. No. 4,720,124, by W. M. Taylor and T. R. Schmitz discloses a telescoping joint with lightly serrated cylindrical surfaces having an interference fit on the inner and outer members and movement of the two members is allowed by the introduction of pressure between the members to overcome the interference fit which allows the adjustment in length of the joint. On release of pressure, such surfaces engage each other to lock the joint in position and to provide a metal-to-metal seal. One embodiment of this application allows pressure to be used to move the members of the joint to an extended position.

SUMMARY

The present invention relates to an improved telescoping joint having an inner tubular member, an outer tubular member, seal means establishing pressure areas for extending and retracting the tubular members to lengthen and shorten the joint and means for delivering fluid under pressure to the pressure area providing the desired movement, locking means carried by said outer tubular member, pressure responsive means for setting and releasing said locking means into and from locking engagement with the inner tubular member, seal means for established a metal-to-metal seal between the inner and outer tubular member, and pressure responsive means for setting and releasing the seal means.

An object of the present invention is to provide an improved telescoping joint which can be positioned between the ends of two pipe sections and readily adjusted in length by extension or retraction, locked in the position of the desired length and having a metal-to-metal seal between the two members of the joint which is separate from the means locking the members in position.

Another object is to provide an improved telescoping joint which can be extended or retracted into a desired position between two pipe sections in a subsea location and simply set and then sealed.

Still another object is to provide an improved rugged and easily operated telescoping joint which can be installed by a diver in a subsea location without the necessity of the diver manually adjusting the length of the joint.

BRIEF DESCRIPTION OF THE DRAWINGS

These and other object and advantages of the present invention are hereinafter set forth and explained with reference to the drawings wherein.

DESCRIPTION OF THE PREFERRED EMBODIMENT

Figure 1:
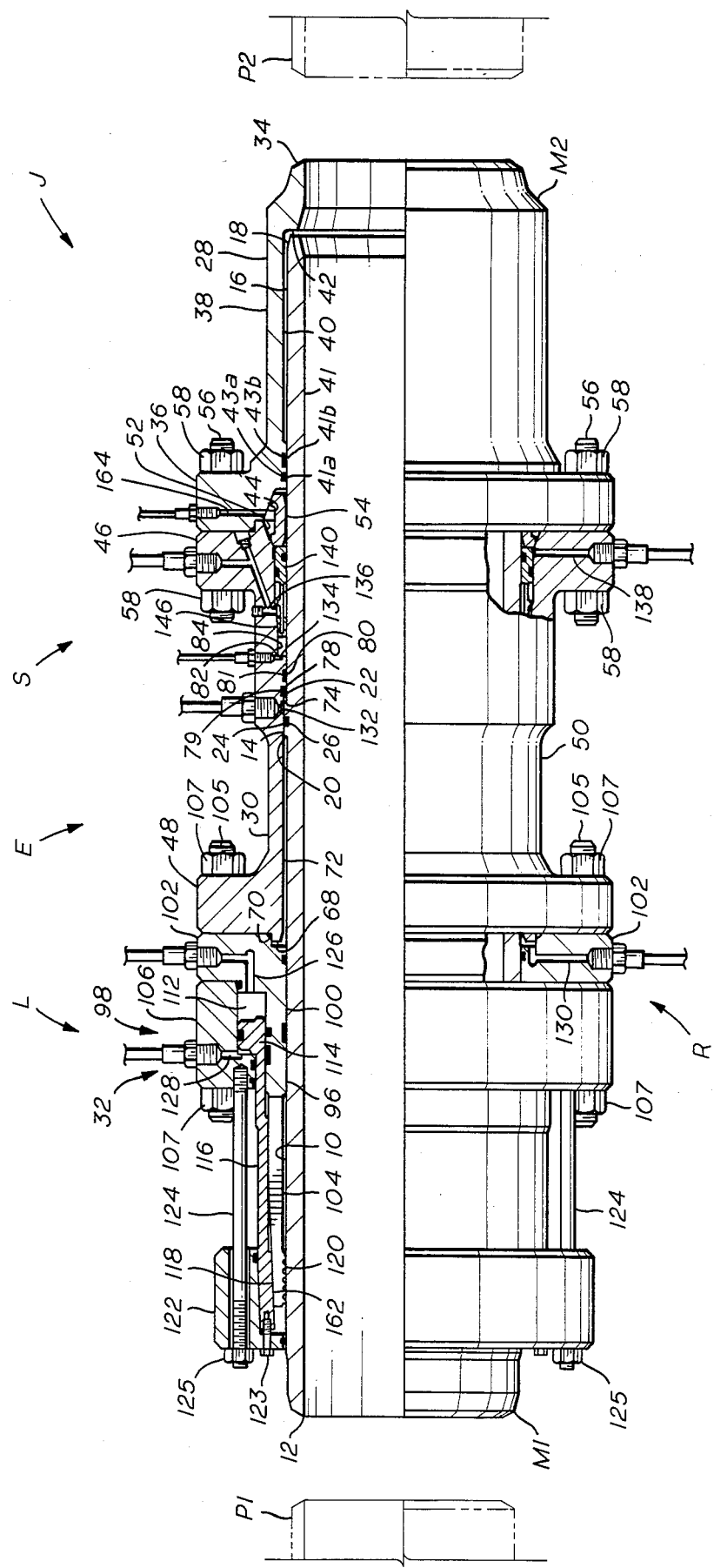
FIG. 1 is a sectional view of the improved telescoping joint of the present invention in its retracted position.
Figure 2:
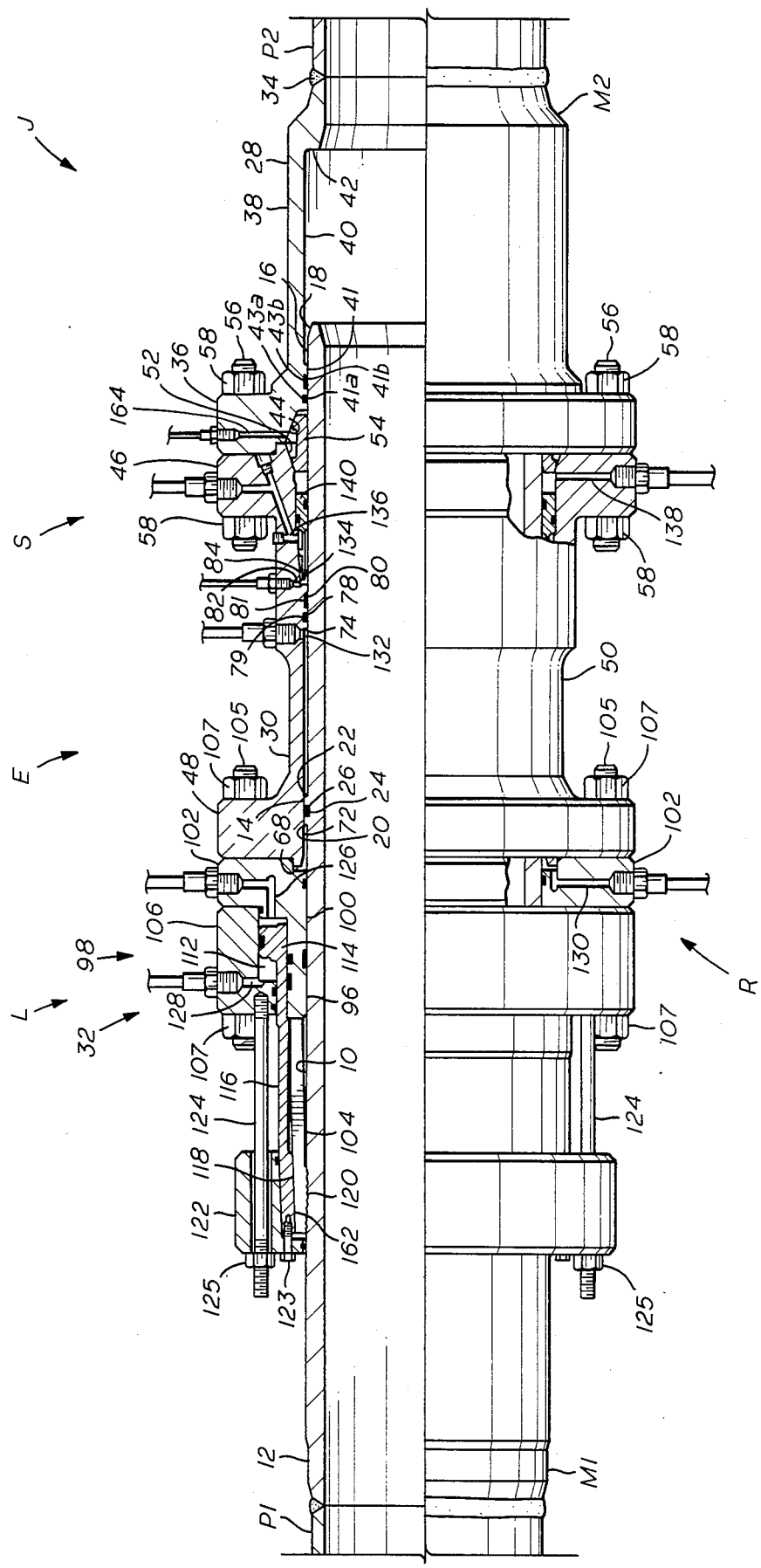
FIG. 2 is another similar view of the joint shown in FIG. 1 but in its extended position.

Improved telescoping joint J of the present invention as shown in the drawings includes inner tubular member M1 which is formed at its end for connection (as by welding) to the exposed end of pipeline P1 (shown in broken lines) and outer tubular member M2 which is formed at its end for connection (as by welding) to the exposed end of pipeline P2 (shown in broken lines). Joint J also includes extension means E and retraction means R, locking means L and sealing means S as hereinafter explained.

Inner tubular member M1 is tubular in shape, has a substantially cylindrical interior and includes exterior surface 10 extending from the end 12 which connects to pipeline P1 to rib 14 and exterior surface 16 extending from rib 14 to the end 18 which is to be positioned within member M2. Shoulder 20 is provided by rib 14 at the end of surface 10 and shoulder 22 is also provided by rib 14 at the beginning of surface 16. Groove 24 is provided in the central portion of rib 14 facing outwardly to receive O ring 26 as shown.

Figure 3:
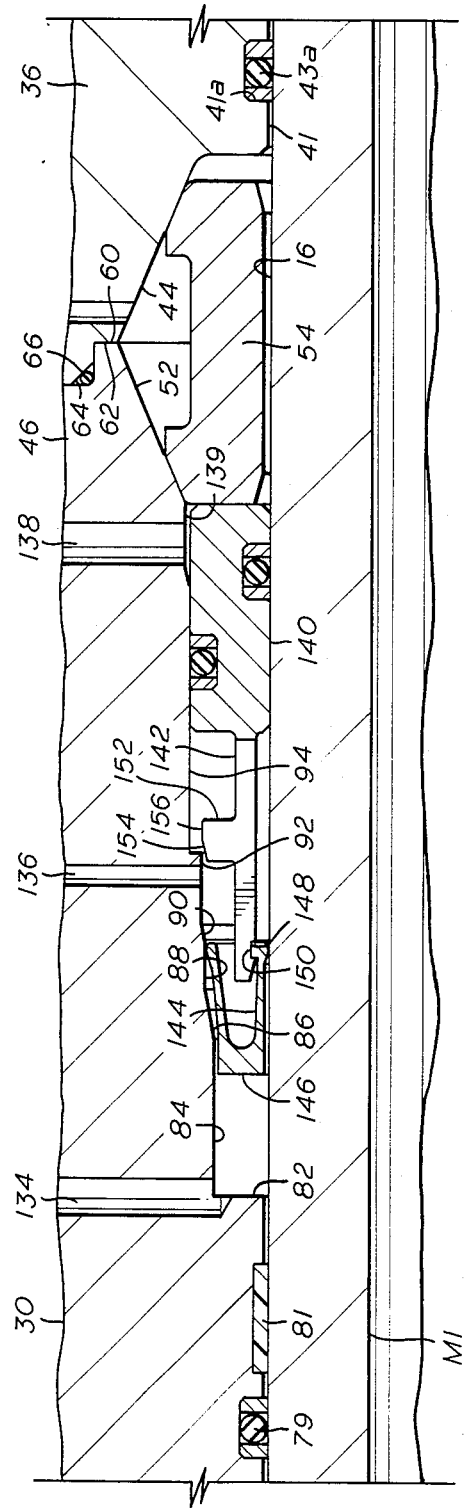
FIG. 3 is a partial detail sectional view of the seal means of the joint shown in released position.
Figure 4:
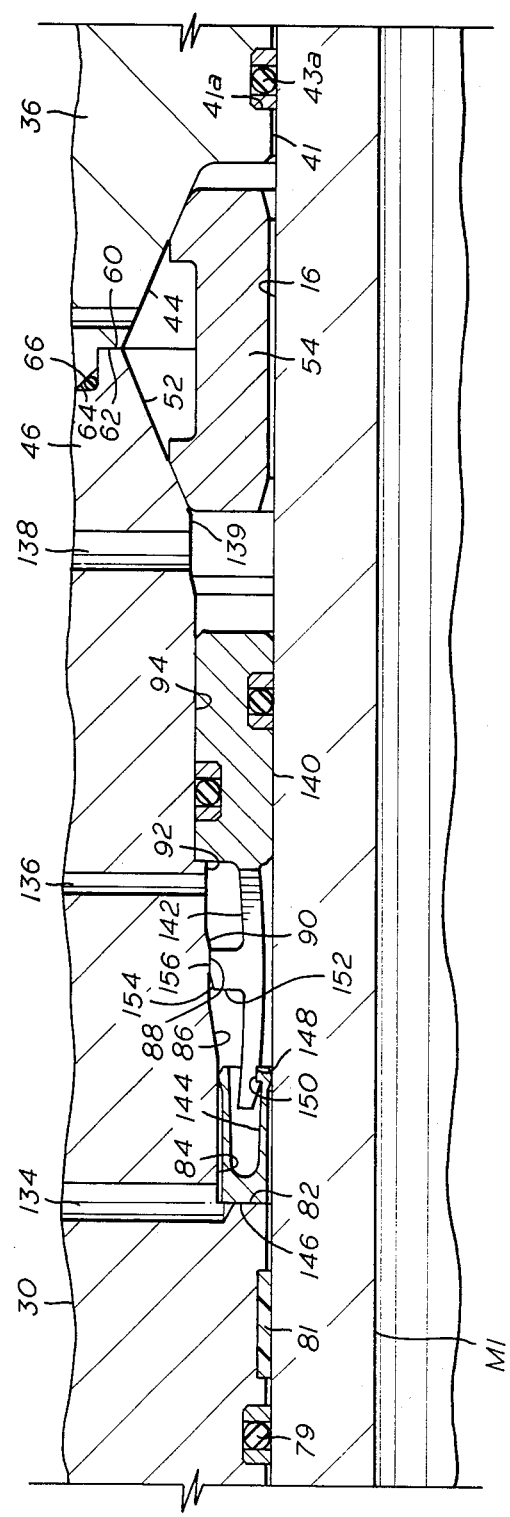
FIG. 4 is a similar sectional view of the seal means of the joint shown in FIG. 3 but illustrated in its set position.

Outer tubular member M2 includes end member 28, spool member 30 connected to end member 28 and locking assembly 32 connected to spool member 30. End member 28 includes end 34 suitable for connection to pipeline P2 and with an internal diameter the same as tubular member M1, flange 36 and body 38 having inner surface 40 with a diameter sufficiently large to receive the end 18 of tubular member M1 therein. Shoulder 42 is formed at the end of surface 40. The opposite end of surface 40 from shoulder 42 ends in rib 41 with O ring groove 41a and bearing ring groove 41b to receive O ring 43a and bearing ring 43b as shown. Flange 36 is provided with tapered recess 44 on its interior surface. Spool member 30 includes flanges 46 and 48 at each end and body 50 between flanges 46 and 48. The inner end of flange 46 includes tapered recess 52 which coacts with recess 44 on end member 28 to receive seal ring 54 therein for sealing between the flanges. Studs 56 and nuts 58 provide the means for connecting flanges 46 and 36 together. As best seen in FIGS. 3 and 4, flange 46 includes projection 60 which extends into recess 62 on the face of flange 36 and bevel 64 is provided between recess 62 and the face of flange 36 so that O ring 66 is trapped therein to provide an additional seal between the flanges. Flange 48 includes projection 68 to define recess 70 between the upper surface of projection 68 and the face of flange 48. The interior of spool member 30 includes interior surface 72 extending from projection 68 to shoulder 74. Shoulder 74 is provided by rib 76 which includes O ring groove 78 for O ring 79 and bearing ring groove 80 for bearing ring 81. Rib 76 forms shoulder 82 with inner surface 84. The interior of spool 30 from shoulder 82 includes surface 84, tapered surface 86, surface 88, tapered surface 90, surface 92 and counterbore surface 94.

Figure 5:
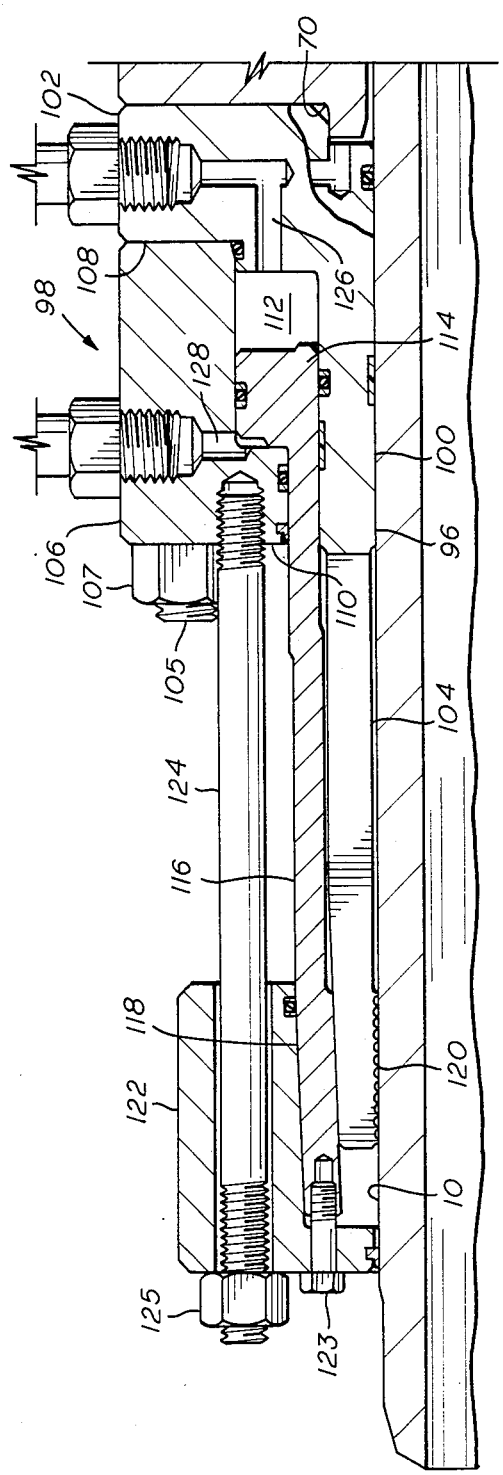
FIG. 5 is a partial detail sectional view of the locking means of the joint shown in its released position.
Figure 6:
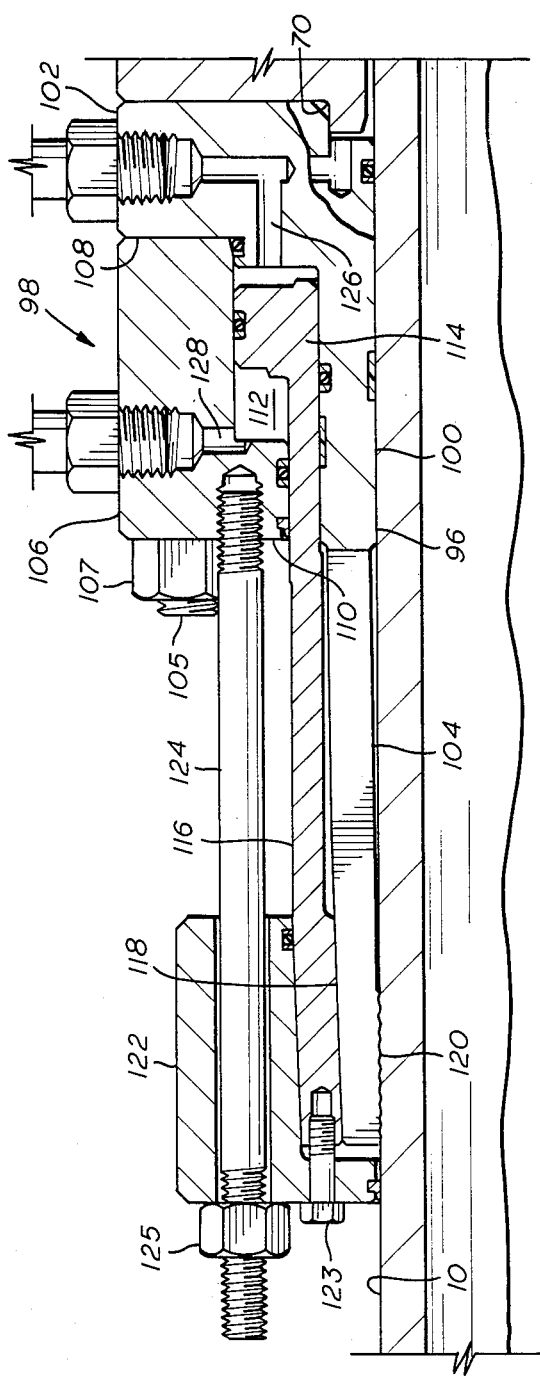
FIG. 6 is a similar sectional view of the locking means of the joint shown in FIG. 5 but illustrated in its set position.

Locking assembly 32 includes gripping or engaging element 96 and actuating means 98 as illustrated in FIGS. 5 and 6. Gripping element 96 includes body 100 having flange 102 and fingers 104 extending to the left of body 100 as shown. Ring 106 is sealed in recess 108 on the face of flange 102 and is secured in position by studs 105 which extend through ring 106, flange 102 and flange 48 and nuts 107. Ring 106 has inwardly projecting lip 110 which has its inner surface spaced a short distance radially outward from the exterior of body 100. The shape of ring 106 coacts with body 100 and flange 102 of element 96 to form annular cylinder 112 in which piston 114 is positioned for reciprocation. Piston 114 includes suitable inner and outer seals. Tubular extension 116 extends from piston 114 in sealing relation to the inner edge of lip 110 and the exterior of body 100 into surrounding engagement with the exterior tapered surfaces 118 of fingers 104. The inner surface of the ends of fingers 104 includes teeth 120 which are preferably machined to have an included apex angle of approximately 50 degrees and in a 12 inch joint would have 16 teeth at 0.250 pitch. The apex of teeth 120 in the released position, as shown in FIGS. 1 and 5, should be closely spaced with respect to the exterior surface 10 of tubular member M1 (e.g. approximately 0.010 inch max. space). Ring 122 is secured by screws 123 to the outer end of extension 116 and is slidable on studs 124 which are threaded into ring 106 with nuts 125 threaded onto the outer end of studs 124 at a position to allow full release or locking of locking assembly 32.

Passage 126 extends through flange 102 into the release end of cylinder 112 and passage 128 extends through ring 106 into the set end of cylinder 112. Additionally passage 130 extends through flange 102 into a position to deliver fluid under pressure on the interior 65 and between flanges 102 and 48. Passage 132 extends through body 50 of spool member 30 to deliver fluid under pressure to a position on the exterior surface of rib 14 to the right of O ring 26. Passage 134 extends through body 50 into a position opening through the left end of surface 84. Passage 136 extends through body 50 to a position opening through surface 92. Passage 138 extends through flange 46 to a position extending through the right portion of second counterbore surface 139 to supply pressure fluid urging piston 140 to the left. Piston 140 is annular in shape and is positioned between the exterior surface 16 of member M1 and interior surface 94 and includes fingers 142 extending into and engaging with inner leg 144 of annular metal channel shaped seal ring 146. The inner surface of the distal end of fingers 142 include groove 148 into which projection 150 on leg 144 is engaged. When piston 140 is in the position shown in FIG. 3, the inner leg 144 of seal ring 146 does not touch surface 16 of the inner tubular member M1 and joint J can be extended or retracted without damage to seal leg 144. Projections 152 of fingers 142 has outer surface 154 which is tapered and flat surface 156. Surfaces 154 and 156 are provided to coact with surfaces 90 and 88 to provide an inward force on fingers 142 to cause the inner leg 144 of seal ring 146 to be moved into a sealing contact with surface 16 of the inner tubular member M1 and to be maintained in this mode by residual stress in fingers 142.

When improved joint J of the present invention is to be used to replace a damaged section in a subsea pipeline, the damaged section is first cut free and removed and then replacement joint J is lowered into position between the free ends of the pipeline. If joint J is shorter than the gap between the pipeline ends P1 and P2 as shown, then extension means E is actuated by a diver or remote controlled vehicle by admitting fluid under pressure through passage 132 and venting or relieving the pressure in passage 130. The fluid under pressure delivered through passage 132 acts on an annular area between the seal of O ring 26 on surface 72 and the seal of O ring 79 on surface 16 of inner tubular member M1. The pressure on this area is exerted to move inner tubular member M1 to the left as shown in the drawings and outer tubular member M2 to the right. If the joint J is longer when extended than the gap between the pipeline ends, then retraction means R is actuated by a diver or remote controlled vehicle by admitting fluid under pressure through passage 130 and venting or relieving the pressure in passage 132. The fluid under pressure delivered through passage 130 acts on an annular area between the seal of O ring 79 against surface 10 and the seal of O ring 26 on surface 72. The pressure on this area is exerted to move inner tubular member M1 to the right as shown in the drawings and outer tubular member M2 to the left. When the desired length of joint J is achieved the communications with passages 130 and 132 are closed to lock the joint J in its position of desired length.

The trapping of hydraulic fluid within the areas mentioned above will resist the change in length of joint J. However, it is preferred that joint J be positively locked in position by the energizing of locking means L. This is accomplished by the admission of fluid under pressure through passage 128 while providing a return or vent through passage 126. The fluid delivered through passage 128 enters the left-hand end of annular cylinder 112 and moves piston 114 to the right. This causes tubular extension 116 and ring 122 also to move to the right. The inner surface 162 of extension 116 is in engagement with the exterior tapered surface 118 on the outer ends of fingers 104. The length of the stroke of piston 114 is sufficient to cause surface 162 to cam teeth 120 into locking engagement with exterior surface 10 of inner tubular member M1 providing the positive lock between members M1 and M2. In this position nuts 125 are tightened on studs 124 to secure locking assembly in its locked position. If it is desired that this positive lock be released it is only necessary to unthread nuts 125 and to supply fluid under pressure through passage 126 and to vent or return fluid from passage 128.

With the locking of locking means L, sealing means S is actuated to provide the desired metal-to-metal seal between the exterior of inner tubular member M1 and the interior of outer tubular member M2 at a position near the inner end of joint J and upstream from locking means L, extension means E and retracting means R. This seal is provided by the supply of fluid under pressure through passage 138 and the venting or return of fluid through passage 136. The fluid under pressure in the annular area between surface 94 and surface 16 urges piston 140 to move to the left. The movement of piston 140 moves metal seal ring 146 into engagement with shoulder 82 in the confined space between surface 16 on inner tubular member M1 and surface 84 on the interior of spool member 30. This movement is transmitted to seal ring 146 through piston fingers 142 to leg 144 of seal ring 146. The spacing between surfaces 16 and 84 is such that the outer leg of seal ring 146 is caused to bend inward by the reduction of the radial dimension of the space in which seal ring 146 is positioned. This causes the outer leg to be stressed so that it maintains a positive metal-to-metal seal against such surfaces as shwon in FIG. 4. At the same time, the inner seal leg 144 is moved into sealing contact with surface 16 of inner tubualr member M1 by the camming action of surfaces 90 and 88 coacting with surfaces 154 and 156 and thereby depressing fingers 142. Release of locking means L is achieved by reversing the procedure. Fluid under pressure is delivered through passage 136 and passage 138 is vented or returned. This causes piston 140 to move to the right. Fingers 142 which are held in engagement with inner leg 144 or seal ring 146 pull seal ring 146 to the right until it is in the position as shown in FIG. 3. The camming of fingers 142 against leg 144 by the engagement of projection surfaces 154 and 156 against surfaces 90 and 88 ensures that the metal-to-metal seal will be release by the reverse movement of piston 140.

Once seal ring 146 has been moved into set position, it is often desirable to test to determine whether or not it has created a tight seal. This is done before joint J is fixed to the free ends of the pipeline. Testing is accomplished by supplying fluid under pressure through both passages 136 and 138 and checking for leakage at passage 134. The supply of fluid to both of passages 136 and 138 ensures that piston 140 does not move from set position and also exerts fluid pressure on seal ring 146. If testing established that seal ring 146 is fluid tight then the repair of the pipeline can be completed by securing the ends of joint J to the free ends of the pipeline as by welding. Testing of seal ring 54 may be accomplished by checking the pressure of fluids in passage 164 which extends through flange 36.

What is claimed is:

1. A telescoping joint comprising
    an inner tubular member,
    an outer tubular member having an inner diameter sufficiently large to receive the inner tubular member therein,
    a plurality of seals being spaced apart axially and positioned between the interior of the outer tubular member and the exterior of the inner tubular member and having different effective sealing diameters to establish a joint extending area and a joint retracting area therebetween,
    means for supplying fluid under pressure to said extending and retracting areas to cause relative extension and retraction movement of said members,
    engaging means carried by said outer tubular member,
    pressure responsive cam means coacting with said engaging means to lock and release said engaging means to and from said inner tubular member,
    a metal-to-metal seal for sealing between said inner and outer tubular members,
    said seal being positioned in an area between said tubular members which has a decreasing radial dimension in one axial direction,
    said seal being U-shaped ring with its legs facing in the direction of the internal pressure from the inner tubular member, and
    pressure responsive means for setting said seal by movement in the narrowing axial direction to move the seal into sealing engagement with the tubular members and for releasing said seal by movement in with widening axial direction to move the seal from its sealing engagement.

2. A telescoping joint acording to claim 1 wherein said metal-to-metal seal includes
    means supplying fluid under pressure to said seal pressure responsive means.

3. A telescoping joint according to claim 1 including means for pressure testing said metal-to-metal seal.

4. A telescoping joint according to claim 2 wherein said metal-to-metal seal also includes
    a plurality of fingers extending from said pressure responsive means and engaging said seal ring so that the seal ring moves with the movement of said pressure responsive means between release and set positions.

5. A telescoping joint according to claim 4 wherein
    said seal ring when set is positioned in an annular recess between said tubular members,
    the inner leg of said seal ring includes a lip at its end, and
    said fingers engage said leg lip.

6. A telescoping joint according to claim 5 including
    means on said fingers and coacting with said decreasing diameter for camming said fingers into tight engagement with said leg lip.

7. A telescoping joint according to claim 2 wherein said pressure responsive means includes
    an annular seal piston positioned in said annular recess between said tubular members for axial movement therein and having sealing means between said piston and said tubular members, and
    said supply means includes ports into each end of said annular seal piston recess.

8. A telescoping joint according to claim 7 including
    a test port extending through said outer tubular member downstream of said ring whereby pressure supplied to both ports of said annular seal piston recess locks said seal piston and pressurizes said seal ring and any leakage past said seal ring is detected at said test port.

9. A telescoping joint for use in a subsea location comprising an inner tubular member, an outer tubular member having an inner diameter sufficiently large to receive the inner tubular member slidably therein, a plurality of seals for sealing between the exterior of the inner tubular member and the interior of the outer tubular member, said seals having different diameters and being spaced apart axially to establish effective pressure areas for extending and retracting said inner tubular member with respect to said outer tubular member, means for supplying fluid under pressure selectively to said effective pressure areas, means carried by said outer tubular member for engaging said inner tubular member is locking engagement, pressure responsive means for actuating said engaging means and for releasing said engaging means, means for supplying fluid under pressure selectively to the pressure responsive for said engaging means to move said engaging means between its locked and released positions, metal seal for sealing between the exterior of said inner tubular member and the interior of said outer tubular member.

said seal being positioned in an area between said tubular members which has a decreasing radial dimension in one axial direction, said seal being a U-shaped ring with its legs facing in the direction of the internal pressure from the inner tubular member, pressure responsive means for moving said metal seal into sealing position and for moving said metal seal out of sealing position, and means for supplying fluid under pressure selectively to said pressure responsive means for moving said metal seal between its sealed and unsealed positions.

10. A telescoping joint according to claim 9 including mechanical means for securing said engaging means and its pressure responsive actuating means in the locked position.

11. A telescoping joint according to claim 8 wherein said outer tubular member includes a plurality of sections with means securing the sections together to facilitate assembly of said outer tubular member on said inner tubular member while preserving said effective pressure areas for extension and retraction of the members.

* * * * *